Patented Dec. 1, 1936

2,062,885

UNITED STATES PATENT OFFICE 2,062,885

RUBBER COMPOSITION AND PRESERVATION OF RUBBER

Joseph R. Ingram, Nitro, W. Va., assignor, by mesne assignments, to Monsanto Chemical Company, St. Louis, Mo., a corporation of Delaware No Drawing. Application October 28, 1933, Serial No. 695,720

8 Claims. (Cl. 18—50)

The present invention relates to the art of rubber manufacture, and particularly relates to the preparation of rubber compositions which resist deterioration due to aging or to exposure to the atmosphere. It has long been known that such deterioration can be greatly retarded by treating the rubber either before or after vulcanization with certain substances known as age-resisters or antioxidants. One object of this invention is to provide a new and superior class of antioxidants for rubber. A further object of this invention is to provide a new and superior class of materials which when incorporated into rubber, preferably before the vulcanization thereof, imparts thereto properties markedly resistant to tear and cracking when portions thereof have been repeatedly and alternately stretched and the tension removed. Such a process is analogous to the flexing of an automobile tire in actual road service.

The age resisting characteristics of a vulcanized rubber product can be readily ascertained by subjecting samples of the vulcanized product in a bomb to the action of oxygen under elevated pressure and at an elevated temperature. The aged rubber samples are then examined and tested and the test data compared with the results obtained on testing the unaged rubber samples. The deterioration in properties effected as a result of the oxidation treatment is indicative of the result that would normally be expected of that particular stock during actual service. Such a test is known as the Bierer-Davis aging test and produces an effect on a vulcanized rubber stock comparable with that resulting from several years of natural aging of the rubber depending upon the condition of the test. In all the tests hereinafter set forth, the aging was carried out at temperatures of 70° C. and an oxygen pressure of 300 pounds per square inch.

The flex cracking resistance of the vulcanized rubber products was determined on a flexing machine as set forth by L. V. Cooper, Analytical Edition of Industrial and Engineering Chemistry, vol. 2, No. 4, 1930, pages 391–394.

According to the present invention, a new class of antioxidants or age-resisters has been found which, upon incorporating into a rubber stock, imparts exceptional age resisting qualities and flex cracking resistance to the vulcanized rubber product. The compounds herein disclosed as imparting such desirable properties to vulcanized rubber comprise the reaction products of a mono primary amino diphenyl and a ketone.

For example, the following reaction products are typical members of the preferred class of materials outlined above: reaction products of ortho amino diphenyl, para amino diphenyl, mixtures of ortho amino diphenyl and para amino diphenyl, for example a mixture of substantially 45% ortho amino diphenyl and 55% para amino diphenyl respectively, with acetone, methyl ethyl ketone, diacetone alcohol, mesityl oxide, phorone, di-isopropyl ketone, isobutyl methyl ketone, acetophenone and benzophenone.

Any one or a mixture of the above enumerated substances or of these substances with other antioxidants may be incorporated into rubber with good effect on its age resisting qualities and flex cracking resistance thereof.

The following are to be understood as illustrative of the invention and not limitative of the scope thereof.

Example I 60 parts by weight of para amino diphenyl and 166 parts by weight of acetone were placed in a suitable reactor and heated under positive pressure in the presence of a suitable catalyst or condensing agent, for example 1.88 parts by weight of bromine, for eighteen hours at a temperature of substantially 170 to 180° C. At the end of this period the water produced by the reaction and any unreacted acetone and para amino diphenyl were removed from the reaction mass preferably by distillation. The residue comprising the preferred reaction product was incorporated in the usual manner in a rubber tread stock comprising

| | Parts |
|---|---|
| Smoked sheet rubber | 100 |
| Carbon black | 40 |
| Zinc oxide | 10 |
| Sulfur | 3 |
| Pine tar | 2 |
| Stearic acid | 3 |
| Reaction product of benzol chloride and the sodium salt of mercaptobenzothiazole | 0.8 |
| Diphenyl guanidine | 0.2 |
| Reaction product of para amino diphenyl and acetone | 1.0 |

The rubber stock thus compounded was vulcanized in the well known manner and portions of the vulcanized product were then artificially aged by heating in a bomb for 48 hours at a temperature of 70° C. and under a pressure of 300 pounds of oxygen per square inch. A comparison between the aged and unaged rubber product is given in Table I.

*Table I*

| Cure | | | Modulus of lbs/in² at 300% | Elasticity in elongations of 500% | Tensile at break in lbs/in² | Ult. elong. percent |
| Mins. | Lbs. steam pressure | Hrs. aged | | | | |
| --- | --- | --- | --- | --- | --- | --- |
| 60 | 25 | 0 | 1625 | 3470 | 4315 | 600 |
| 60 | 25 | 48 | 1615 | 3105 | 3535 | 555 |
| 75 | 25 | 0 | 1785 | 2805 | 4285 | 570 |
| 75 | 25 | 48 | 1725 | --- | 3240 | 495 |
| 90 | 25 | 0 | 1980 | 4150 | 4450 | 525 |
| 90 | 25 | 48 | 1805 | --- | 3200 | 490 |

The data set forth in Table I shows that the preferred class of materials, for example, the reaction product of acetone and para amino diphenyl, comprise an important group of antioxidants.

If convenient or desirable a smaller ratio of ketone to amine may be employed than that set forth above. Thus, acetone and para amino diphenyl in the ratio of substantially two molecular proportions of the former to substantially one molecular proportion of the latter have been reacted by heating under positive pressure at a temperature of substantially 170 to 180° C. for substantially 20 hours. The water formed by the reaction and any unreacted acetone or para amino diphenyl were removed from the reaction product preferably by distillation. The resulting crude reaction product was distilled at reduced pressure, and a liquid distilling at 180 to 240° C. under 4 mm. pressure of mercury, thereby obtained. The material so obtained was incorporated in a typical tread stock comprising

| | Parts |
| --- | --- |
| Smoked sheet rubber | 100 |
| Carbon black | 50 |
| Zinc oxide | 5 |
| Sulfur | 3 |
| Pine tar | 2 |
| Stearic acid | 3 |
| Reaction product of benzoyl chloride and the sodium salt of mercaptobenzothiazole | 0.8 |
| Diphenyl guanidine | 0.2 |
| Reaction product of para amino diphenyl and acetone | 1.0 |

The rubber stock so compounded after vulcanizing, on aging in the oxygen bomb in the manner hereinbefore set forth, was found to possess most desirable antioxidant properties. Furthermore, upon flexing the cured rubber stock in the manner described above, it was found to be markedly superior in flex cracking resistance to a similar stock containing no antioxidant.

If desirable acetone may be reacted with ortho amino diphenyl and para amino diphenyl or a mixture of the two amines at atmospheric pressure. A convenient method comprises the continuous introduction of acetone into the molten amino diphenyl containing a small proportion of bromine as catalyst.

*Example II*

64 parts by weight (0.38 mol.) of a mixture of substantially 55% para amino diphenyl and substantially 45% ortho amino diphenyl and 44 parts by weight (0.76 mol.) of acetone were placed in a suitable reactor equipped with a reflux air condenser to which was connected a water cooled condenser so positioned as to condense but not return to the reactor any unreacted acetone. 1.5 parts by weight of a suitable catalyst or condensing agent, for example bromine, were added thereto. The mixture of ortho and para amino diphenyl, acetone and catalyst was heated to substantially 150–155° C. and an additional amount of acetone comprising 300 parts by weight added slowly thereto by means of a dropping funnel extending below the surface of the liquid over a period of substantially six hours. The reaction mixture was then dissolved in a suitable solvent, for example benzene, and the solution extracted with a dilute acid, for example 5% hydrochloric acid, in order to eliminate any unreacted amino diphenyl. The solution, after extracting with hydrochloric acid, was washed first with water and then with an alkali for example a 5% aqueous caustic soda solution until neutral, dried with a suitable dehydrating agent as for example anhydrous sodium sulfate, and the solvent removed preferably by distillation. The residual product comprising a viscous liquid was incorporated in the usual manner in a rubber tread stock comprising

| | Parts |
| --- | --- |
| Smoked sheet rubber | 100 |
| Carbon black | 50 |
| Zinc oxide | 5 |
| Sulfur | 3 |
| Stearic acid | 3 |
| Pine tar | 2 |
| Reaction product of benzoyl chloride and the sodium salt of mercaptobenzothiazole | 0.8 |
| Diphenyl guanidine | 0.2 |
| Reaction product of acetone and a mixture of ortho and para amino diphenyl | 1.0 |

The compounded rubber stock was vulcanized and the vulcanized rubber product found to possess the typical desirable aging qualities of the preferred class of materials. The cured rubber product containing the reaction product of acetone and the mixture of substantially 55% para amino diphenyl and 45% ortho amino diphenyl was also found on testing in the manner hereinbefore set forth to be markedly superior in flex cracking resistance over a similar stock containing none of the new and preferred class of materials.

From the specific examples hereinbefore set forth, it is shown that rubber compositions containing small proportions of the preferred class of materials markedly resist the deterioration influences due to heat, oxidation and flexing.

Obviously, practice of the present invention is not limited to the specific compositions given above, such compositions being merely illustrative of the manner of employing the antioxidants or age-resisters of this invention. The antioxidants or age-resisters may be employed in conjunction with other vulcanizing agents than those specifically disclosed, for this invention is applicable generally to pure rubber or rubber compositions of the most varied nature. Furthermore, the preferred class of materials may be employed in rubber stocks in conjunction with other accelerators than the one specifically shown with varying differences in tensile and modulus properties but still exhibiting the desirable qualities of the class.

It is to be understood that the term "treating" as employed in the appended claims is used in a generic sense to include either the incorporating of the preferred class of materials into the rubber by milling or similar process, or their addition to the rubber latex before its coagulation, or to the application thereof to the surface of a mass of crude or vulcanized rubber. The term "rubber" is likewise employed in the claims in a generic sense to include caoutchouc, whether natural or synthetic, reclaimed rubber, balata, gutta percha, rubber isomers and like products whether or not admixed with fillers, pigments or accelerating agents.

The present invention is limited solely by the claims attached hereto as part of the present specification.

What is claimed is:

1. The method of preserving rubber which comprises treating rubber with a reaction product obtainable by reacting para amino diphenyl with acetone.

2. The method of preserving rubber which comprises treating rubber with a reaction product obtainable by heating in the presence of a halogen condensation catalyst under pressure substantially one molecular proportion of para amino diphenyl with substantially two molecular proportions of acetone at a temperature of substantially 170 to 180° C.

3. The method of preserving rubber which comprises treating rubber with a reaction product obtainable by heating in the presence of a halogen condensation catalyst under pressure substantially one molecular proportion of para amino diphenyl with substantially two molecular proportions of acetone at a temperature of substantially 170° to 180° C. and having a distilling range of substantially 180 to 240° C. at 4 mm. pressure of mercury.

4. The method of preserving rubber which comprises treating rubber with a reaction product obtainable by reacting para amino diphenyl with an aliphatic ketone containing more than two but less than ten carbon atoms.

5. The method of preserving rubber which comprises treating rubber with a reaction product obtainable by passing acetone continuously into para amino diphenyl heated to liquid temperature in the presence of an acidic condensation catalyst.

6. The vulcanized rubber product prepared by heating rubber and sulfur in the presence of a reaction product obtainable by reacting para amino diphenyl with an aliphatic ketone containing more than two but less than ten carbon atoms.

7. The method of preserving rubber which comprises treating rubber with a reaction product obtainable by reacting para amino diphenyl with one member of a group consisting in acetone, methyl ethyl ketone, diacetone alcohol, mesityl oxide, phorone, di-isopropyl ketone and isobutyl methyl ketone.

8. The vulcanized rubber product prepared by heating rubber and sulfur in the presence of a reaction product obtainable by reacting para amino diphenyl with acetone.

JOSEPH R. INGRAM.

CERTIFICATE OF CORRECTION.

Patent No. 2,062,885.　　　　　　　　　　　　　　　　　　December 1, 1936

JOSEPH R. INGRAM.

It is hereby certified that error appears in the printed specification of the above numbered patent requiring correction as follows: Page 1, second column, line 43, for "benzol" read benzoyl; and that the said Letters Patent should be read with this correction therein that the same may conform to the record of the case in the Patent Office.

Signed and sealed this 16th day of February, A. D. 1937.

(Seal)　　　　　　　　　　　　　　　　　　　　　　　Henry Van Arsdale
　　　　　　　　　　　　　　　　　　　　　　　Acting Commissioner of Patents.

of the preferred class of materials into the rubber by milling or similar process, or their addition to the rubber latex before its coagulation, or to the application thereof to the surface of a mass of crude or vulcanized rubber. The term "rubber" is likewise employed in the claims in a generic sense to include caoutchouc, whether natural or synthetic, reclaimed rubber, balata, gutta percha, rubber isomers and like products whether or not admixed with fillers, pigments or accelerating agents.

The present invention is limited solely by the claims attached hereto as part of the present specification.

What is claimed is:

1. The method of preserving rubber which comprises treating rubber with a reaction product obtainable by reacting para amino diphenyl with acetone.

2. The method of preserving rubber which comprises treating rubber with a reaction product obtainable by heating in the presence of a halogen condensation catalyst under pressure substantially one molecular proportion of para amino diphenyl with substantially two molecular proportions of acetone at a temperature of substantially 170 to 180° C.

3. The method of preserving rubber which comprises treating rubber with a reaction product obtainable by heating in the presence of a halogen condensation catalyst under pressure substantially one molecular proportion of para amino diphenyl with substantially two molecular proportions of acetone at a temperature of substantially 170° to 180° C. and having a distilling range of substantially 180 to 240° C. at 4 mm. pressure of mercury.

4. The method of preserving rubber which comprises treating rubber with a reaction product obtainable by reacting para amino diphenyl with an aliphatic ketone containing more than two but less than ten carbon atoms.

5. The method of preserving rubber which comprises treating rubber with a reaction product obtainable by passing acetone continuously into para amino diphenyl heated to liquid temperature in the presence of an acidic condensation catalyst.

6. The vulcanized rubber product prepared by heating rubber and sulfur in the presence of a reaction product obtainable by reacting para amino diphenyl with an aliphatic ketone containing more than two but less than ten carbon atoms.

7. The method of preserving rubber which comprises treating rubber with a reaction product obtainable by reacting para amino diphenyl with one member of a group consisting in acetone, methyl ethyl ketone, diacetone alcohol, mesityl oxide, phorone, di-isopropyl ketone and isobutyl methyl ketone.

8. The vulcanized rubber product prepared by heating rubber and sulfur in the presence of a reaction product obtainable by reacting para amino diphenyl with acetone.

JOSEPH R. INGRAM.

CERTIFICATE OF CORRECTION.

Patent No. 2,062,885. December 1, 1936

JOSEPH R. INGRAM.

It is hereby certified that error appears in the printed specification of the above numbered patent requiring correction as follows: Page 1, second column, line 43, for "benzol" read benzoyl; and that the said Letters Patent should be read with this correction therein that the same may conform to the record of the case in the Patent Office.

Signed and sealed this 16th day of February, A. D. 1937.

(Seal)

Henry Van Arsdale
Acting Commissioner of Patents.

CERTIFICATE OF CORRECTION.

Patent No. 2,062,885.                                     December 1, 1936

JOSEPH R. INGRAM.

It is hereby certified that error appears in the printed specification of the above numbered patent requiring correction as follows: Page 1, second column, line 43, for "benzol" read benzoyl; and that the said Letters Patent should be read with this correction therein that the same may conform to the record of the case in the Patent Office.

Signed and sealed this 16th day of February, A. D. 1937.

Henry Van Arsdale
(Seal)                              Acting Commissioner of Patents.

Certificate of Correction

Patent No. 2,062,885. December 1, 1936.

JOSEPH R. INGRAM

It is hereby certified that error appears in the printed specification of the above numbered patent requiring correction as follows: Page 2, first column, lines 5 to 10 inclusive, in the heading to the table, for

| Modulus of lbs/in² at 300% | Elasticity in elongations of 500% |
|---|---| read

| Modulus of elasticity in lbs/in² at elongations of | |
|---|---|
| 300% | 500% |

;

and that the said Letters Patent should be read with this correction therein that the same may conform to the record of the case in the Patent Office.

Signed and sealed this 10th day of August, A. D. 1937.

[SEAL]

LESLIE FRAZER,
*Acting Commissioner of Patents.*